US011261614B2

(12) United States Patent
Hu et al.

(10) Patent No.: US 11,261,614 B2
(45) Date of Patent: Mar. 1, 2022

(54) MULTISTOREY GARAGE FOR BUSES AND METHOD OF USING SAME

(71) Applicant: China Construction Steel Structure Corp. Ltd., Guangdong (CN)

(72) Inventors: Shuai Hu, Guangdong (CN); Hongyan Wang, Guangdong (CN); Cong Xu, Guangdong (CN); Maochen Zhou, Guangdong (CN); Biao Liao, Guangdong (CN); Xuanmao Liao, Guangdong (CN)

(73) Assignee: China Construction Steel Structure Corp. Ltd., Guangdong (CN)

( * ) Notice: Subject to any disclaimer, the term of this patent is extended or adjusted under 35 U.S.C. 154(b) by 188 days.

(21) Appl. No.: 16/620,561

(22) PCT Filed: Aug. 27, 2018

(86) PCT No.: PCT/CN2018/102536
§ 371 (c)(1),
(2) Date: Dec. 9, 2019

(87) PCT Pub. No.: WO2019/042257
PCT Pub. Date: Mar. 7, 2019

(65) Prior Publication Data
US 2021/0087840 A1 Mar. 25, 2021

(30) Foreign Application Priority Data
Sep. 4, 2017 (CN) .......................... 201710786217.3

(51) Int. Cl.
*E04H 6/22* (2006.01)
*E04H 6/18* (2006.01)
(52) U.S. Cl.
CPC ............... *E04H 6/182* (2013.01); *E04H 6/22* (2013.01)

(58) Field of Classification Search
CPC ............ E04H 1/182; E04H 6/22; E04H 6/188
See application file for complete search history.

(56) References Cited

U.S. PATENT DOCUMENTS 4,936,730 A * 6/1990 Morioka ................. E04H 6/282
414/239
5,314,285 A * 5/1994 Lai ............................ E04H 6/22
414/236
(Continued)

FOREIGN PATENT DOCUMENTS

CN 200996210 Y 12/2007
CN 102337789 A 2/2012
(Continued)

OTHER PUBLICATIONS

Machine translation of CN102337789 from espacenet. (Year: 2012).*
ISA/CN, International Search Report for PCT Patent Application No. PCT/CN2018/102536, dated Sep. 25, 2018, 3 pages.

*Primary Examiner* — Mark C Hageman
(74) *Attorney, Agent, or Firm* — NK Patent Law

(57) ABSTRACT

A multistorey garage for buses includes: an elevator platform; an elevator transmission system; a vehicle supporting plate; a charging device; and a steel cable set. The elevator platform is positioned on a ground floor of the multistorey garage. The elevator platform includes a storage and retrieval device and a safety leveling device. The elevator transmission system is positioned on a top floor of the multistorey garage. The elevator transmission system and the elevator platform are arranged symmetrically with respect to a horizontal central axis of the multistorey garage. The steel cable set is connected to the elevator transmission system, a counterweight, and the elevator platform. In the multistorey garage, a vehicle supporting plate is provided in each parking space. The charging device is mounted at the (Continued)

vehicle supporting plate. Also provided is a method of using the multistorey garage for buses.

14 Claims, 15 Drawing Sheets

(56) References Cited

U.S. PATENT DOCUMENTS

| | | | | |
|---|---|---|---|---|
| 5,868,540 | A * | 2/1999 | Hirose | E04H 6/282 414/234 |
| 6,168,365 | B1 * | 1/2001 | Lee | E04H 6/225 414/253 |
| 7,815,410 | B2 * | 10/2010 | Shinozuka | E04H 6/22 414/234 |

FOREIGN PATENT DOCUMENTS

| | | |
|---|---|---|
| CN | 205224743 U | 5/2016 |
| CN | 106760764 A | 5/2017 |
| CN | 206397225 U | 8/2017 |
| CN | 107575072 A | 1/2018 |
| RU | 2436919 C1 | 12/2011 |

* cited by examiner

MULTISTOREY GARAGE FOR BUSES AND METHOD OF USING SAME

CROSS-REFERENCE TO RELATED APPLICATION

This application is a U.S. National Stage Application of International Patent Application No. PCT/CN2018/102536, entitled "MULTISTOREY GARAGE FOR BUS AND METHOD OF USING SAME", and filed on Aug. 27, 2018, which claims priority to Chinese Patent Application No. 201710786217.3, entitled "multistorey garage for buses", and filed on Sep. 4, 2017, which are all is-incorporated herein by reference in their entireties.

FIELD

The present disclosure relates to the field of parking garages, and in particular, to a multistorey garage for a bus and a method of using same.

BACKGROUND

As people's living standards improve, passenger buses are used to transport passengers in urban and suburban areas to facilitate transportation of people in urban public transportation, which is an important part of urban transportation. With the rapid development of public transportation, buses occupy increasingly large areas, and a multistorey bus garage, that is, multistorey parking, emerges to ease the shortage of parking spaces.

However, current bus garages are of a comb type and cannot provide automatic charging. There are an increasingly large number of alternative fuel buses that use battery packs, and the parking of which becomes more and more inconvenient. In addition, some current bus garages are of a planar movement type, which occupy large areas, and pose strict requirements on the width of the parking site.

SUMMARY

The main objective of the present disclosure includes providing a multistorey garage for buses, so as to resolve the technical problems in the prior art that bus garages cannot provide automatic charging and bus garages of a planar movement type occupy large areas.

To achieve the foregoing objective, there is provided in the present disclosure a multistorey garage for buses, including:

an elevator platform, an elevator transmission system, a vehicle supporting plate, a charging device, a steel cable set, and a counterweight, the elevator platform is positioned on a ground floor of the multistorey garage, and the elevator platform includes a storage and retrieval device and a safety leveling device;

the elevator transmission system is positioned on a top floor of the multistorey garage, and the elevator transmission system and the elevator platform are arranged symmetrically with respect to a horizontal central axis of the multistorey garage;

the steel cable set is connected to the elevator transmission system, the counterweight, and the elevator platform;

the elevator transmission system includes a traction wheel, two motors, a transition wheel, a main transmission frame, and a steering wheel set;

the traction wheel is mounted on the main transmission frame, one of the two motors is mounted at one side of the traction wheel, and the other of the two motors is mounted on the other side of the traction wheel;

the transition wheel is mounted on the main transmission frame and is positioned between the traction wheel and the motor at the one side of the traction wheel;

the steering wheel set is separately mounted on a middle beam, a front end beam, and the main transmission frame of the elevator transmission system;

the vehicle supporting plate is provided in each parking space of the multistorey garage; and the charging device is mounted on the vehicle supporting plate.

The present disclosure provides a multistorey garage for buses, including an elevator platform, an elevator transmission system, a vehicle supporting plate, a charging device, and a steel cable set, wherein the elevator platform is positioned on a central axis of a bottom floor of the multistorey garage, the elevator platform includes a storage and retrieval device and a safety leveling device, the elevator transmission system is positioned on a top floor of the multistorey garage, the elevator transmission system and the elevator platform are symmetrical, the steel cable set connects the elevator transmission system and the elevator platform, the elevator transmission system includes a traction wheel, motors, a transition wheel, a main transmission frame and a steering wheel set, the traction wheel is mounted on the main transmission frame, the motors are respectively mounted on two sides of the traction wheel, the transition wheel is mounted on the main transmission frame and is positioned at one side of the traction wheel, the steering wheel set is separately mounted on a middle beam, a front end beam, and the main transmission frame of the elevator transmission system, the vehicle supporting plate is provided in each parking space of the multistorey garage, and the charging device is mounted on the vehicle supporting plate.

In one aspect, in the multistorey garage, the elevator transmission system uses power to enable the elevator platform to make a vertical movement, so that the multistorey garage occupies a significantly reduced area, more buses can be parked in a same area, and the utilization of land is improved. In another aspect, in the multistorey garage, the charging device is mounted on the vehicle supporting plate, so that an automatic charging function is implemented.

It should be noted herein that, the multistorey garage has an elevation passage in a height direction for the elevator platform to move, and the elevator platform is positioned on a ground floor in a default state (initial state), thereby facilitating bus storage.

Optionally, the multistorey garage for buses is generally of a steel structure, and the steel structure is a framework structure in the garage that is made of a steel material and supports operation members of the garage.

Optionally, the steel structure includes H steel.

Optionally, the bottom floor of the multistorey garage is provided with a bus washing shop, and the bus washing shop may be provided on the right side of the bottom floor of the multistorey garage or may be provided on the left side of the bottom floor of the multistorey garage.

Optionally, a ground transverse movement system is disposed in the bus washing shop for a bus to transversely move into the bus washing shop.

Optionally, the charging device is positioned near an outer end on the vehicle supporting plate, and the charging device is mounted on the vehicle supporting plate in each parking space.

Optionally, the storage and retrieval device includes two chain boxes, a framework, a chain, a chain wheel, a chain pin, a motor, and a transmission shaft;

the two chain boxes are respectively mounted at two ends of the framework;

two parallel chains are respectively disposed in the two chain boxes, and the chains are wound around and engaged with the chain wheel; and two chain pins are respectively disposed in the two chain boxes, and the chain pins are mounted on the parallel chains respectively at a preset distance from a central line of symmetry.

Optionally, two safety leveling devices are provided and are symmetrically mounted at two ends of the elevator platform with respect to a central axis;

the safety leveling device includes a double output shaft motor, a coupling, a leadscrew, a leadscrew nut, a connecting block, a pin, and a pin base;

the double output shaft motor is positioned on a longitudinal centerline of the elevator platform, and two output shafts of the double output shaft motor are respectively connected to a leadscrew by the coupling;

the leadscrew nut is sleeved over the leadscrew, and the leadscrew nut is connected to the pin by the connecting block; and the pin base is fixedly disposed on a longitudinal beam of the elevator platform, and the pin is driven by the double output shaft motor to be screwed into or screwed out from the pin base.

Optionally, the steering wheel set includes a first steering wheel, a second steering wheel, and a third steering wheel;

the first steering wheel is mounted in the middle of the middle beam of the elevator transmission system;

the second steering wheel is mounted in the middle of the front end beam of the elevator transmission system; and the third steering wheel is mounted on the main transmission frame.

Optionally, the steel cable set includes a plurality of steel cables, wherein one end of each of a preset number of steel cables is fixedly connected to a hanging beam of the elevator transmission system, the preset number of steel cables are sequentially wound around a movable pulley at a front end of the elevator platform, the second steering wheel, the transition wheel, the traction wheel, and a movable pulley disposed on a counterweight, and the other end of each cable is connected to the main transmission frame; and one end of each of the remaining steel cables is fixedly connected to the main transmission frame, the remaining steel cables are sequentially wound around a movable pulley at a rear end of the elevator platform, the third steering wheel, the second steering wheel, the transition wheel, the traction wheel, and the movable pulley at the counterweight of the bottom floor of the multistorey garage, and the other end of each cable is connected to the main transmission frame.

Optionally, the vehicle supporting plate includes a connector cable storage frame, a charging connector, a connector cable, a side beam, a long fork, a short fork, a cross beam, a panel, a longitudinal beam, a vehicle blocking rod, and a roller assembly;

the connector cable storage frame is mounted at a tail end of the vehicle supporting plate, and the charging connector and the connector cable are placed on the connector cable storage frame;

the side beam, the cross beam, the panel, and the longitudinal beam are integrated by a bolt;

the long fork and the short fork are sequentially mounted on an outer side surface of the side beam from outside to inside;

the vehicle blocking rod are mounted at an outermost side of the side beam; and a total of four roller assemblies are respectively mounted at four corners of the vehicle supporting plate by a bolt.

Optionally, the charging device includes a plug assembly and a socket assembly, wherein the plug assembly is mounted on the side beam of the vehicle supporting plate, and the socket assembly is mounted on the steel structure of the parking space.

Optionally, the socket assembly includes a socket support, a slide plate, a socket mounting plate, a pin, a rubber cushion, and a charging socket;

the socket support is mounted on the steel structure of the parking space, the slide plate is mounted on the socket support by the pin, the socket mounting plate is mounted on the slide plate by the pin, and the socket mounting plate is slidable in a direction perpendicular to a sliding direction of the slide plate;

the socket mounting plate is provided with two guiding pointed conical rods;

the charging socket is mounted on the socket mounting plate; and the socket support, the slide plate, and the socket mounting plate are separated by the rubber cushion.

Optionally, the plug assembly includes a plug seat and a charging plug, wherein the plug seat is mounted on a side surface of the side beam of the vehicle supporting plate, the plug seat is provided with two guiding holes, each of the guiding holes matches a pointed conical end of the guiding pointed conical rod, and the guiding pointed conical rod is inserted into the guiding hole to connect the plug assembly and the socket assembly; and the charging plug is mounted on the plug seat.

There is further provided in the present disclosure a using method, which is based on the foregoing multistorey garage;

after a bus is parked on the vehicle supporting plate through a left entrance/exit (right entrance/exit), a charging connector head at a tail portion of the vehicle supporting plate is inserted into an automobile charging socket to get ready for charging, after a user confirms bus storage, the storage and retrieval device is started, and the chain pin on the elevator platform is engaged with the long fork on the vehicle supporting plate, the vehicle supporting plate is moved to the elevator platform, the elevator transmission system uses the power provided under the effect between the steel cable set and the pulley to take the elevator platform upward to an original placement floor for the vehicle supporting plate, at the same time, the counterweight on the bottom floor of the garage enables the elevator platform to move upward more stably, the safety leveling device in the elevator platform is started, the pin in safety leveling is screwed into the pin base with the steel structure the pin in safety leveling under a pushing force provided by the motor, a guide rail of the vehicle supporting plate is aligned with a guide rail of a parking space, the storage and retrieval device then pushes the vehicle supporting plate into the parking space, and when the vehicle supporting plate is almost stored in place, the pointed conical rod on the socket mounting plate is inserted into the guiding hole of the plug seat to align the plug with the socket, after the vehicle supporting plate is stored in place, the plug is completely inserted into the socket, the power is turned on to perform charging, and eventually the elevator platform places an extra vehicle supporting plate in the left entrance/exit (right entrance/exit).

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show some embodiments of the present disclosure, and persons skilled in the art may still derive other drawings from these accompanying drawings without creative efforts.

REFERENCE NUMERALS

Figure 1:
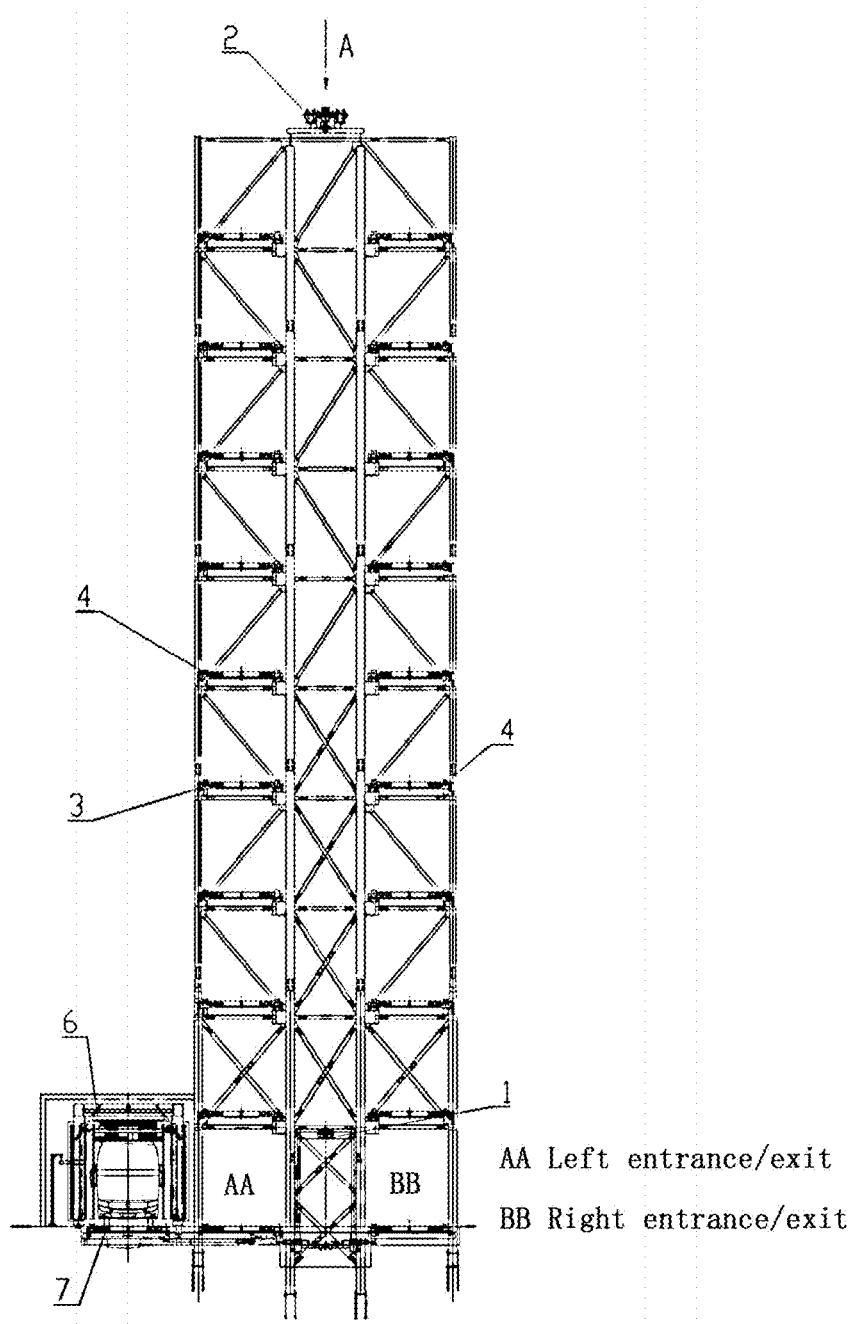
FIG. 1 is an overall front view of a multistorey garage according to an embodiment of the present disclosure.

1—elevator platform; 2—elevator transmission system; 3—vehicle supporting plate; 4—charging device; 5—counterweight; 6—bus washing shop; 7—ground transverse movement system; 8—storage and retrieval device; 9—safety leveling device; 10—traction wheel; 11—motor; 12—transition wheel; 13—main transmission frame; 14—steering wheel set; 15—framework; 16—chain wheel; 17—motor; 18—transmission shaft; 19—first chain box; 20—second chain box; 21—first chain; 22—second chain; 23—first chain pin; 24—second chain pin; 25—double output shaft motor; 26—coupling; 27—leadscrew; 28—leadscrew nut; 29—connecting block; 30—pin; 31—pin base; 32—first steering wheel; 33—second steering wheel; 34—third steering wheel; 35—movable pulley; 36—movable pulley; 37—movable pulley; 38—connector cable storage frame; 39—side beam; 40—long fork; 41—short fork; 42—cross beam; 43—panel; 44—longitudinal beam; 45—roller assembly; 46—vehicle blocking rod; 47—plug assembly; 48—socket assembly; 49—socket support; 50—slide plate; 51—socket mounting plate; 52—pin; 53—rubber cushion; 54—charging socket; 55—plug seat; and 56—charging plug.

DETAILED DESCRIPTION OF THE EMBODIMENTS

The technical solutions in the embodiments of the present disclosure are clearly and thoroughly described below with reference to the accompanying drawings in the embodiments of the present disclosure for clear and thorough understanding of the disclosed objectives, features, and advantages of the present disclosure. Obviously, the described embodiments are merely some embodiments of the present disclosure, but are not all the embodiments of the present disclosure. Based on the embodiments of the present disclosure, all other embodiments derived by a person skilled in the art without any creative efforts shall fall within the protection scope of the present disclosure.

Bus garages in the prior art have the technical problems that they cannot provide automatic charging and bus garages of a planar movement type occupy a relatively large area.

To resolve the foregoing technical problems, there is provided in the disclosure a multistorey garage for buses. After a vehicle is parked on a vehicle supporting plate through a left entrance/exit (right entrance/exit), a charging connector head at a tail portion of the vehicle supporting plate is inserted into an automobile charging socket to get ready for charging. A user confirms bus storage, and the garage starts running: A storage and retrieval device is started. The vehicle supporting plate is moved to an elevator platform. An elevator transmission system takes the elevator platform upward. After the vehicle supporting plate reaches an original placement floor, a safety leveling device is started. A guide rail of the vehicle supporting plate is aligned with a guide rail of a parking space. The storage and retrieval device then pushes the vehicle supporting plate into the parking space. When the vehicle supporting plate is stored in place, a plug is completely inserted into a socket to perform charging. Eventually, the elevator platform takes out an extra vehicle supporting plate and places the extra vehicle supporting plate in a left entrance/exit (right entrance/exit) on an entrance/exit floor.

Figure 2:
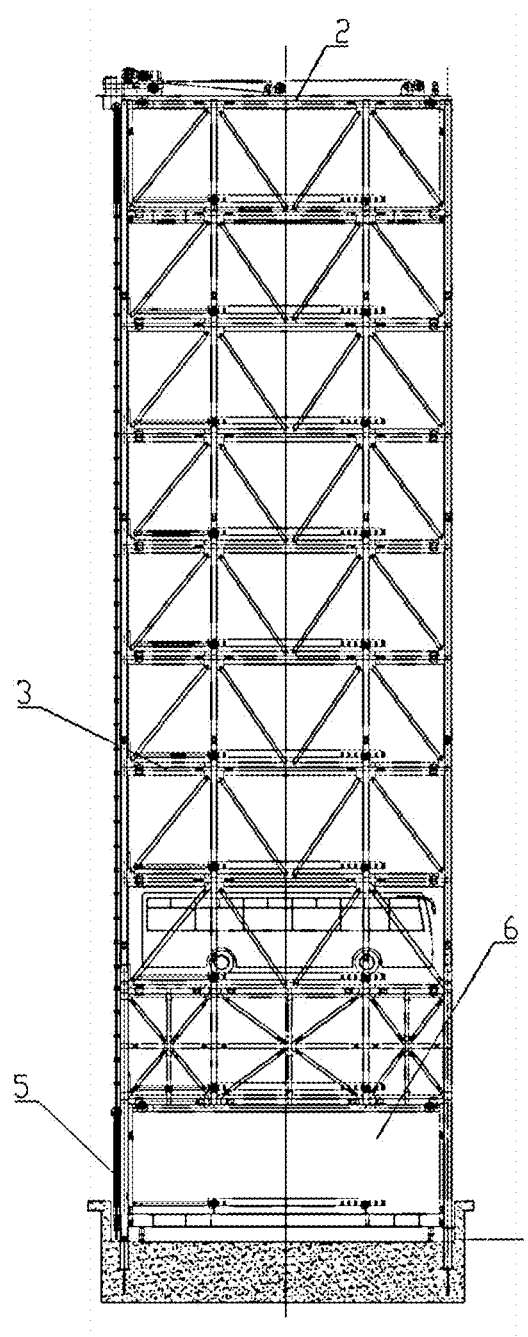
FIG. 2 is an overall left view of the multistorey garage according to an embodiment of the present disclosure.
Figure 3:
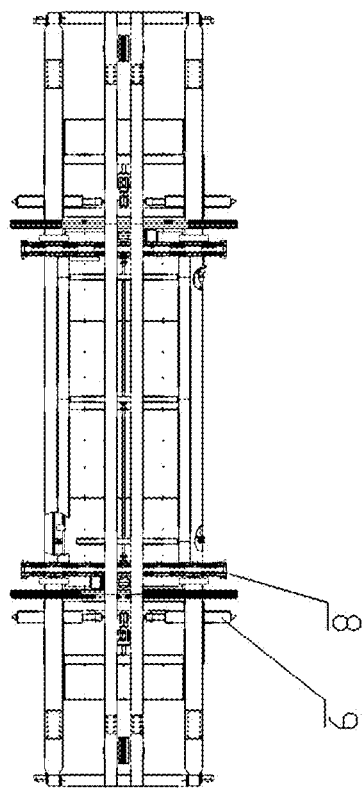
FIG. 3 is a top view of an elevator platform according to an embodiment of the present disclosure.
Figure 4:
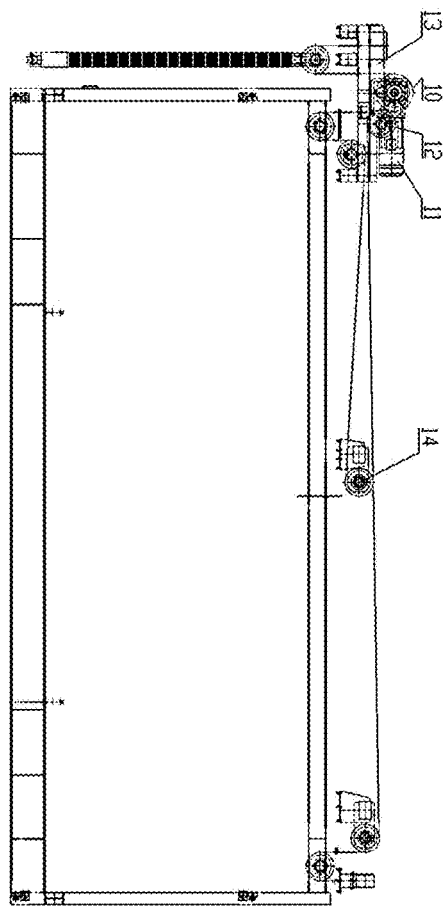
FIG. 4 is an overall view of an elevator transmission system according to an embodiment of the present disclosure.
Figure 5:
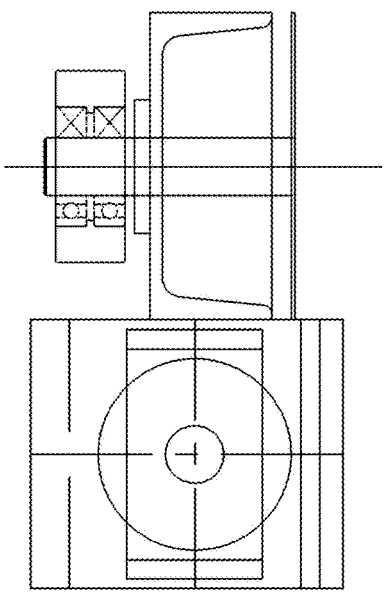
FIG. 5 is a partial enlarged view of a connection in an elevation system according to an embodiment of the present disclosure.
Figure 6:
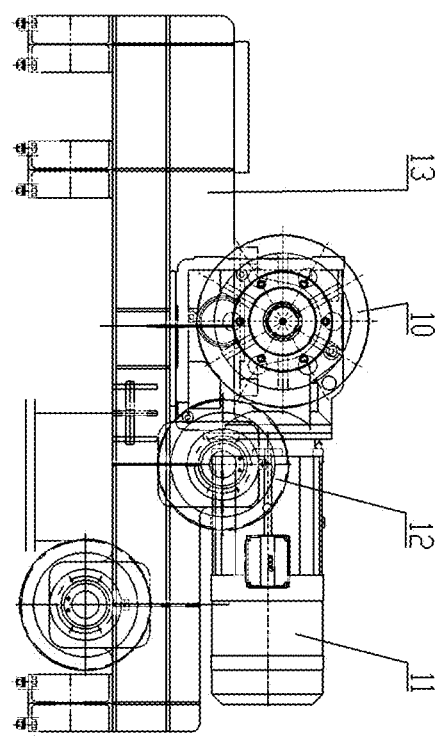
FIG. 6 is a partial enlarged view of a main transmission frame in an elevator transmission system according to an embodiment of the present disclosure.

Reference is made to FIG. 1, FIG. 2, FIG. 3, FIG. 4, FIG. 5, and FIG. 6. FIG. 1 is an overall front view of a multistorey garage according to an embodiment of the present disclosure. FIG. 2 is an overall left view of the multistorey garage according to an embodiment of the present disclosure. FIG. 3 is a top view of an elevator platform according to an embodiment of the present disclosure. FIG. 4 is an overall view of an elevator transmission system according to an embodiment of the present disclosure. FIG. 5 is an enlarged view of a connection in the elevation system according to a disclosed embodiment. FIG. 6 is an enlarged view of a main transmission frame in the elevator transmission system according to an embodiment of the present disclosure. The multistorey garage includes an elevator platform 1, an elevator transmission system 2, a vehicle supporting plate 3, a charging device 4, a steel cable set (not shown), and a counterweight 5. The counterweight 5 is used to balance the elevator platform 1 to make the elevator platform 1 more stable during operation. In this embodiment, the multistorey garage is generally of a steel structure, and the steel structure is a framework structure in the garage that is made of a steel material and supports operation members of the garage. In this embodiment, the steel structure includes H steel. Further, a bottom floor of the multistorey garage is provided with a bus washing shop. The bus washing shop may be provided on the right side of the bottom floor of the garage or may be provided on the left side of the bottom floor of the garage. In FIG. 1, for example, a bus washing shop 6 is provided on the left side of the bottom floor of the garage. Further, a ground transverse movement system 7 is disposed in the bus washing shop 6 for a bus to transversely move into the bus washing shop.

The elevator platform 1 is positioned at a centre of the bottom floor of the multistorey garage. The elevator platform 1 includes a storage and retrieval device 8 and a safety leveling device 9. Specifically, the elevator platform 1 enables a bus to make a vertical elevation movement and a horizontal transverse movement to complete transportation during storage and retrieval of the bus.

The elevator transmission system 2 is positioned on a top floor of the multistorey garage and supplies power for the elevation movement of the elevator platform 1. The elevator transmission system 2 and the elevator platform 1 are arranged symmetrically with respect to a horizontal central axis of the multistorey garage.

Specifically, the steel cable set connects the elevator transmission system 2, the counterweight 5, and the elevator platform 1, so that the elevator transmission system 2 can supply power to the elevator platform 1 more adequately.

The elevator transmission system 2 includes a traction wheel 10, two motors, a transition wheel 12, a main transmission frame 13, and a steering wheel set 14. One of the motors is a motor 11 in the figure, and the other motor is not marked in the figure. The traction wheel 10 is mounted on the main transmission frame 13. The motor 11 is mounted at one side of the traction wheel 10, and the other motor (not shown) is mounted at the other side of the traction wheel 10.

The transition wheel 12 is mounted on the main transmission frame 13, and is positioned between the traction wheel 10 and the motor 11 at the one side of the traction wheel 10. The steering wheel set 14 includes three steering wheel sets 14. The three steering wheel sets 14 are respectively mounted on a middle beam, a front end beam, and the main transmission frame 13 of the elevator transmission system 2.

The vehicle supporting plate 3 is provided in each parking space of the multistorey garage. The charging device 4 is mounted on the vehicle supporting plate 3. Specifically, the charging device 4 is positioned near an outer end on the vehicle supporting plate 3. It should be noted that the charging device is mounted on the vehicle supporting plate in each parking space.

It should be noted herein that the multistorey garage has an elevation passage in a height direction for the elevator platform 1 to move; and the elevator platform 1 is positioned on a ground floor in a default state (initial state), thereby facilitating bus storage.

Figure 7:
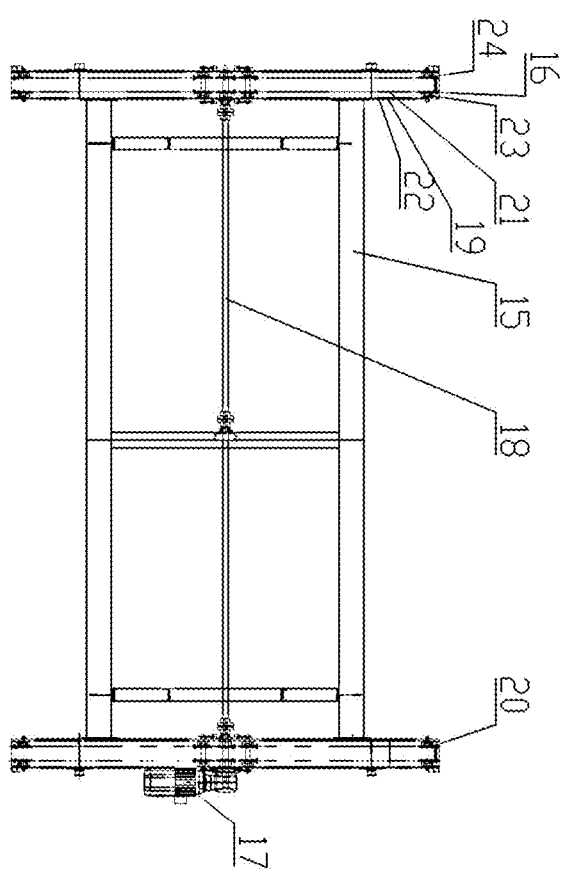
FIG. 7 is an overall view of a storage and retrieval device in an elevator platform according to an embodiment of the present disclosure.
Figure 8:
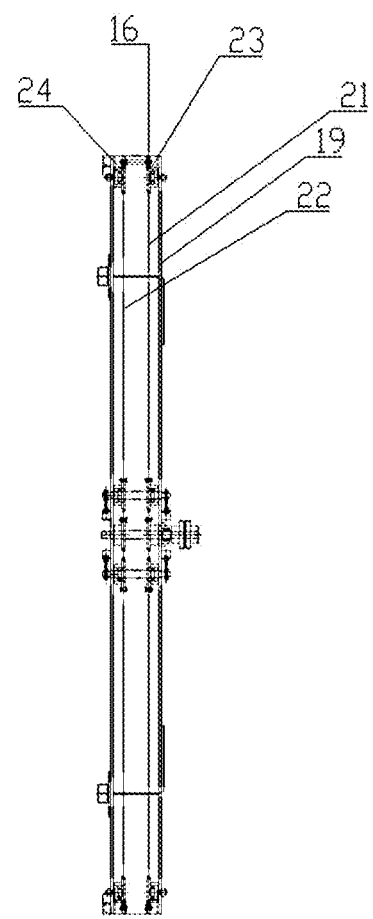
FIG. 8 is an enlarged view of a chain box in a storage and retrieval device according to an embodiment of the present disclosure.

Further, reference is made to FIG. 7 and FIG. 8. FIG. 7 is an overall view of a storage and retrieval device in an elevator platform according to an embodiment of the present disclosure. FIG. 8 is an enlarged view of a chain box part in a storage and retrieval device according to an embodiment of the present disclosure. Optionally, the storage and retrieval device 8 includes two chain boxes, a framework 15, a chain, a chain wheel 16, two chain pins, a motor 17, and a transmission shaft 18. The storage and retrieval device completes the horizontal movement of the bus to enable the bus to be dragged into the elevator platform 1 along with the vehicle supporting plate 3.

Specifically, the two chain boxes are respectively a first chain box 19 and a second chain box 20. The first chain box 19 and the second chain box 20 are respectively fixedly mounted at two ends of the framework 15 by a bolt.

A first chain 21 and a second chain 22 that are parallel to each other are respectively disposed in the two chain boxes. The first chain 21 is wound around and engaged with the chain wheel 16.

Two chain pins are respectively disposed in the two chain boxes. The two chain pins are respectively a first chain pin 23 and a second chain pin 24. The first chain pin 23 and the second chain pin 24 are mounted at the top of the first chain 21 and the second chain 22 that are in parallel respectively at a preset distance from a central line of symmetry. It should be noted that two chain pins (which are not marked in the figure) are also mounted at tail ends of the first chain 21 and the second chain 22 at a preset distance from the central line of symmetry. In addition, a plurality of chain pins (which are not marked in the figure) are also mounted in the middle of the first chain 21 and the second chain 22 at a preset distance from the central line of symmetry.

Figure 9:
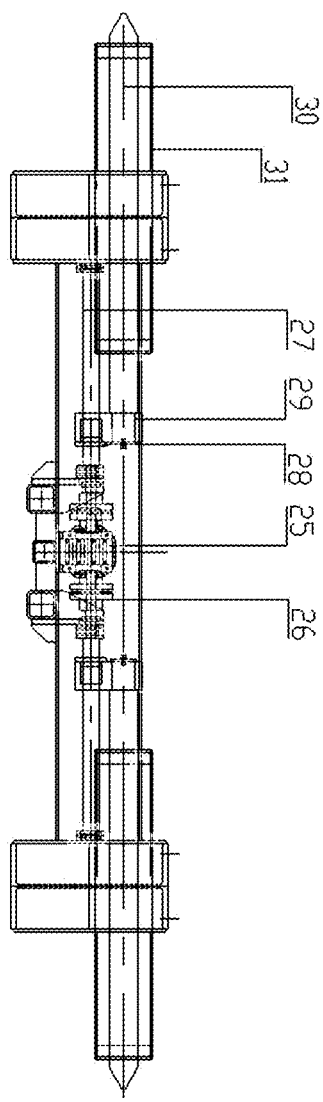
FIG. 9 is a front view of a safety leveling device according to an embodiment of the present disclosure.

Further, referring to FIG. 9, which is a front view of a safety leveling device of an elevator platform according to an embodiment of the present disclosure. Optionally, two safety leveling devices 9 are symmetrically mounted at two ends of the elevator platform 1 with respect to a central axis. One of the safety leveling devices is used as an example in FIG. 7. The safety leveling device 9 includes a double output shaft motor 25, a coupling 26, a leadscrew 27, a leadscrew nut 28, a connecting block 29, a pin 30, and a pin base 31.

Specifically, the safety leveling device enables a bus plate guide rail on the elevator platform 1 to be vertically and horizontally aligned with a bus plate guide rail in a parking space to ensure smooth transition of the vehicle supporting plate 3.

Specifically, the double output shaft motor 25 is positioned at a longitudinal centerline of the elevator platform 1, and two output shafts of the double output shaft motor 25 are respectively connected to the leadscrew 27 by the coupling 26.

Specifically, the leadscrew nut 28 is sleeved over the leadscrew 27, and the leadscrew nut 28 is connected to the pin 30 by the connecting block 29.

Specifically, the pin base 31 is fixedly disposed on a longitudinal beam of the elevator platform 1, and the pin 30 is driven by the double output shaft motor 25 to be screwed into or screwed out from the pin base 31.

Figure 10:
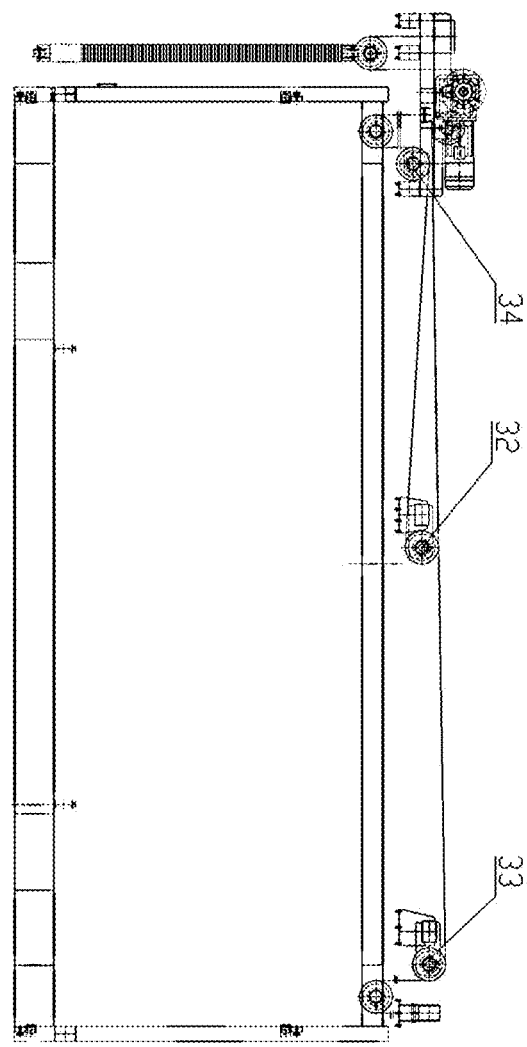
FIG. 10 is an overall position view of a steering wheel set according to an embodiment of the present disclosure.

Further, referring to FIG. 10, which is an overall position view of a steering wheel set according to an embodiment of the present disclosure. Optionally, the steering wheel set 14 includes a first steering wheel 32, a second steering wheel 33, and a third steering wheel 34.

Specifically, the first steering wheel 32 is mounted in the middle of the middle beam of the elevator transmission system 2, the second steering wheel 33 is mounted in the middle of the front end beam of the elevator transmission system, and the third steering wheel 34 is mounted on the main transmission frame 13.

Figure 11:
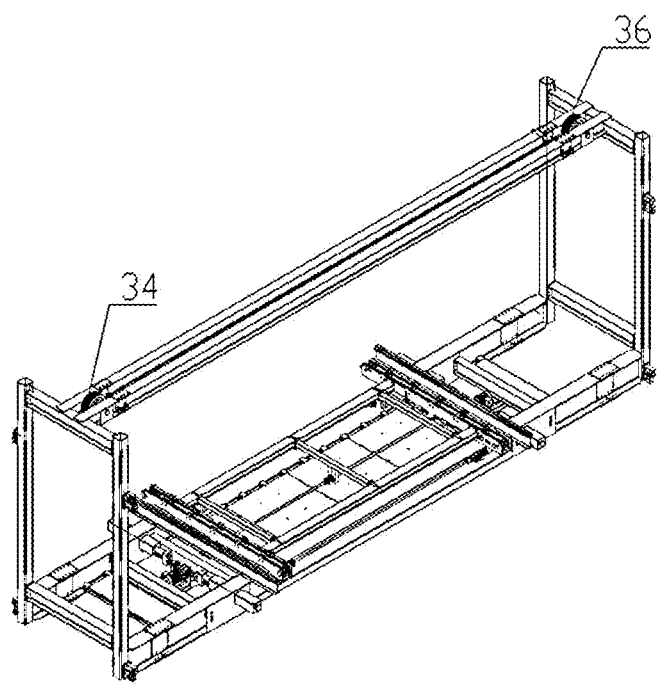
FIG. 11 is a position view of a movable pulley in an elevator platform according to an embodiment of the present disclosure.
Figure 12:
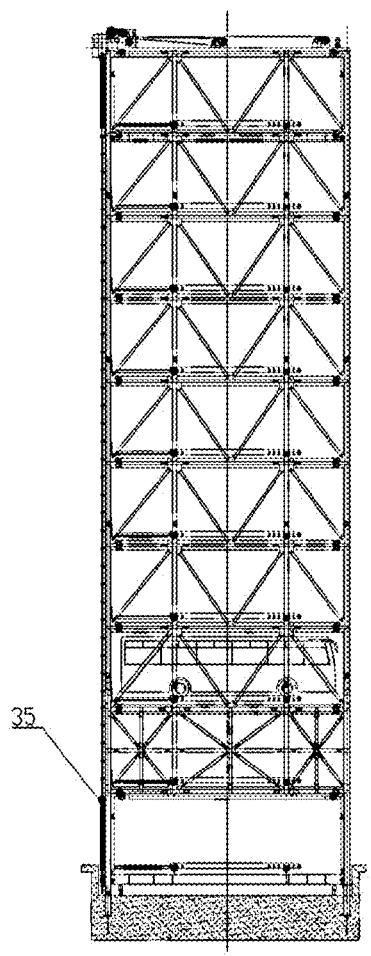
FIG. 12 is a position view of a movable pulley in a counterweight according to an embodiment of the present disclosure.
Figure 13:
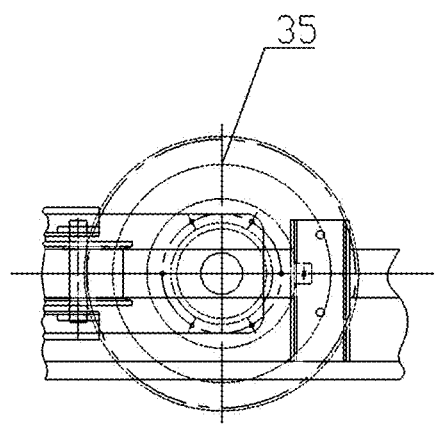
FIG. 13 is a partial enlarged view of a movable pulley in a counterweight according to an embodiment of the present disclosure.

Further, reference is made to FIG. 11, FIG. 12, and FIG. 13. FIG. 11 is a position view of a movable pulley in an elevator platform according to an embodiment of the present disclosure. FIG. 12 is a position view of a movable pulley in a counterweight according to an embodiment of the present disclosure. FIG. 13 is a partial enlarged view of a movable pulley in a counterweight according to an embodiment of the present disclosure. Optionally, the steel cable set includes a plurality of steel cables. One end of each of a preset number of steel cables is fixedly connected to a hanging beam (not marked in the figure) of the elevator transmission system 2. Subsequently, the preset number of steel cables are sequentially wound around a movable pulley 35 at a front end of the elevator platform 1, the second steering wheel 32, the transition wheel 12, the traction wheel 10, and a movable pulley 36 disposed at the counterweight 5. The other end of each cable is connected to the main transmission frame 13.

Specifically, one end of each of the remaining steel cables is fixedly connected to the main transmission frame 13. Subsequently, the remaining steel cables are sequentially wound around a movable pulley at a rear end of the elevator platform 37, the third steering wheel 33, the second steering wheel 32, the transition wheel 12, the traction wheel 10, and the movable pulley 36 disposed at the counterweight 5. The other end of each cable is connected to the main transmission frame 13.

Figure 14:
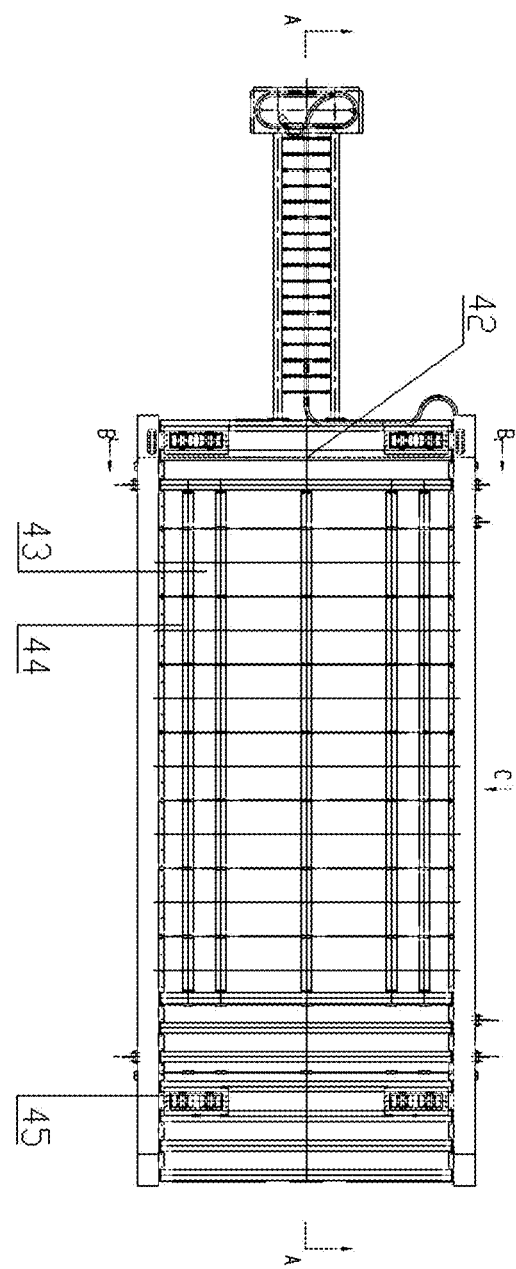
FIG. 14 is an overall view of a vehicle supporting plate according to an embodiment of the present disclosure.
Figure 15:
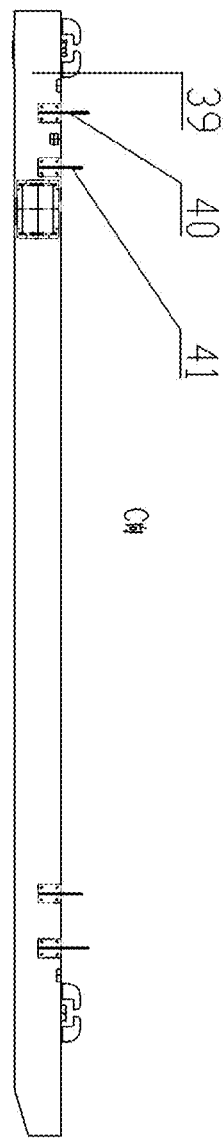
FIG. 15 is a view in a direction c of a vehicle supporting plate according to an embodiment of the present disclosure.
Figure 16:
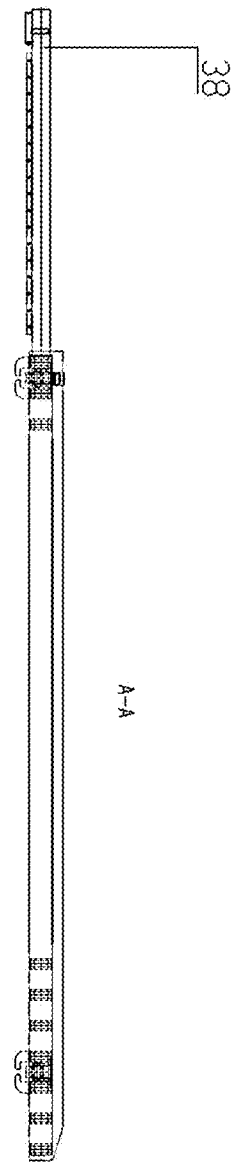
FIG. 16 is a view in a direction a of a vehicle supporting plate according to an embodiment of the present disclosure.
Figure 17:
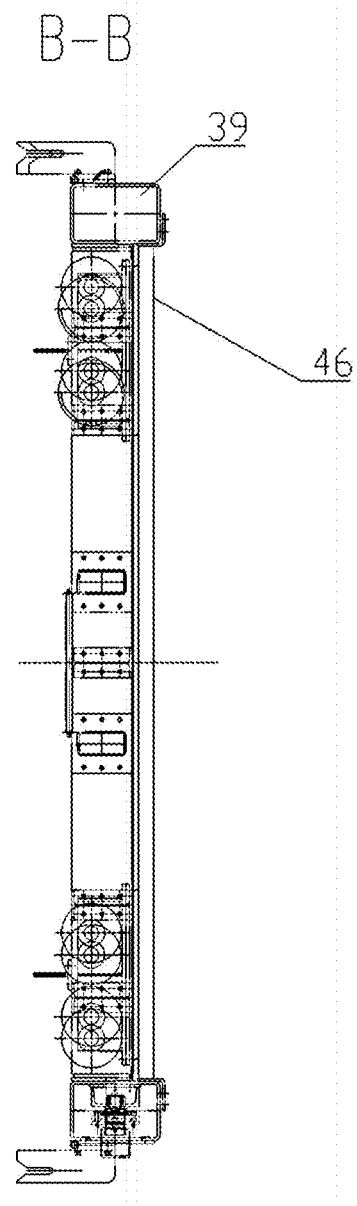
FIG. 17 is a view in a direction b of a vehicle supporting plate according to an embodiment of the present disclosure.

Further, reference is made to FIG. 14, FIG. 15, FIG. 16, and FIG. 17. FIG. 14 is an overall view of a vehicle supporting plate according to an embodiment of the present disclosure. FIG. 15 is a view in a direction c of a vehicle supporting plate according to an embodiment of the present disclosure. FIG. 16 is a view in a direction a of a vehicle supporting plate according to an embodiment of the present disclosure. FIG. 17 is a view in a direction b of a vehicle supporting plate according to an embodiment of the present disclosure. Optionally, the vehicle supporting plate 3 includes a connector cable storage frame 38, a charging connector (not shown), a connector cable (not shown), a side beam 39, a long fork 40, a short fork 41, a cross beam 42, a panel 43, a longitudinal beam 44, a roller assembly 45, and a vehicle blocking rod 46.

Specifically, the connector cable storage frame 38 is mounted at a tail end of the vehicle supporting plate 3, and the charging connector and the connector cable are placed on the connector cable storage frame 38.

Specifically, the side beam 39, the cross beam 42, the panel 43, and the longitudinal beam 44 are integrated by a bolt.

Specifically, the long fork 40 and the short fork 41 are sequentially mounted at an outer side surface of the side beam 39 from outside to inside to enable the vehicle supporting plate to be hooked by the chain pins in the storage and retrieval device 8, so as to drive the vehicle supporting plate to move. The vehicle blocking rod 46 is mounted at an outermost side of the side beam 39 at a front end of the vehicle supporting plate 3, so that a bus can be positioned on the vehicle supporting plate 3. A total of four roller assemblies 45 are respectively mounted at four corners of the vehicle supporting plate 3 by a bolt, so that the vehicle supporting plate can smoothly move along tracks during bus storage.

Figure 18:
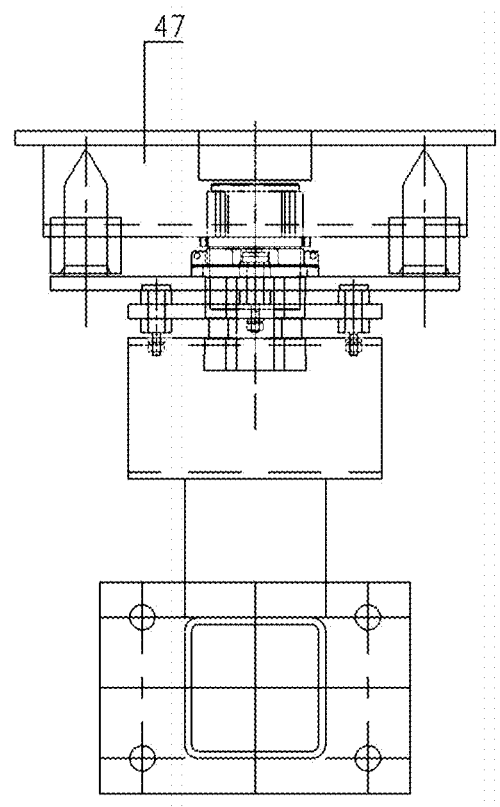
FIG. 18 is an overall front view of a charging device according to an embodiment of the present disclosure.
Figure 19:
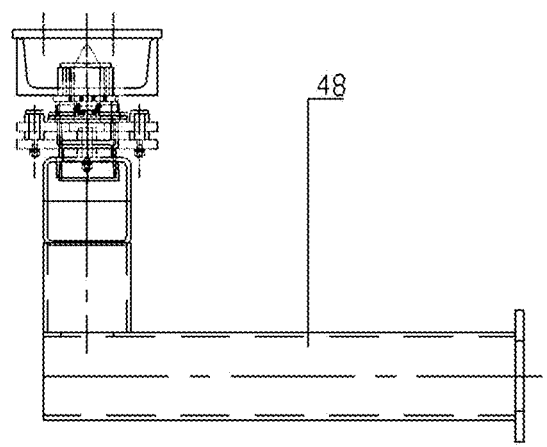
FIG. 19 is an overall side view of a charging device according to an embodiment of the present disclosure.

Further, reference is made to FIG. 18 and FIG. 19. FIG. 18 is an overall front view of a charging device according to an embodiment of the present disclosure. FIG. 19 is an overall side view of a charging device according to an embodiment of the present disclosure. Optionally, the charging device includes a plug assembly 47 and a socket assembly 48. The two parts are respectively mounted on the vehicle supporting plate 3 and a parking space. The plug assembly 47 is mounted on the side beam 39 of the vehicle supporting plate 3. The socket assembly 48 is mounted on the steel structure of the parking space.

Figure 20:
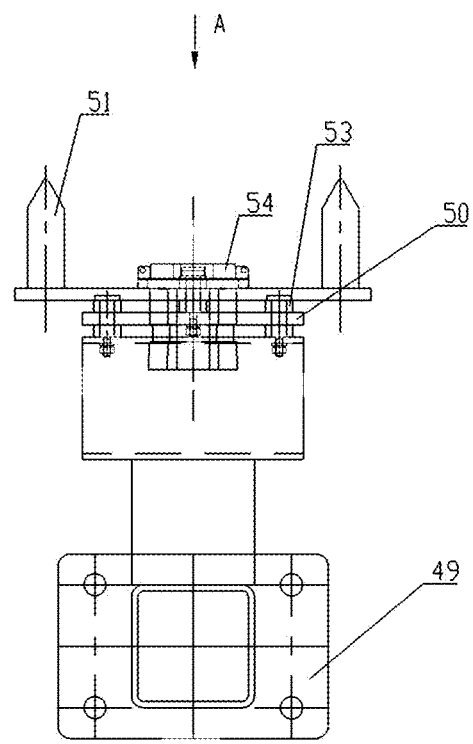
FIG. 20 is a partial enlarged view of a socket assembly according to an embodiment of the present disclosure.
Figure 21:
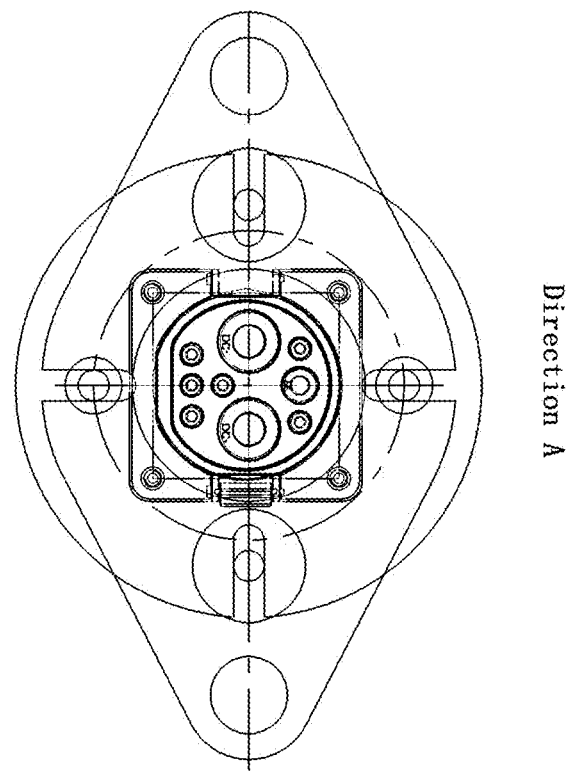
FIG. 21 is a top view in a direction a of a socket assembly according to an embodiment of the present disclosure.
Figure 22:
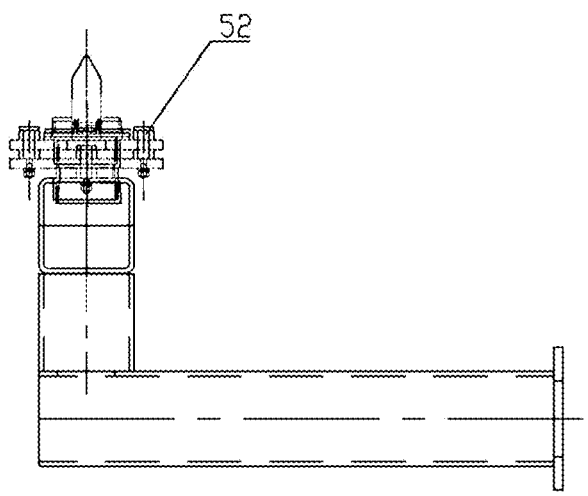
FIG. 22 is a side view of a socket assembly according to an embodiment of the present disclosure.

Further, reference is made to FIG. 20, FIG. 21, and FIG. 22. FIG. 20 is a partial enlarged view of a socket assembly according to an embodiment of the present disclosure. FIG. 21 is a top view in a direction a of a socket assembly according to an embodiment of the present disclosure. FIG. 22 is a side view of a socket assembly according to an embodiment of the present disclosure. Optionally, the socket assembly 48 includes a socket support 49, a slide plate 50, a socket mounting plate 51, a pin 52, a rubber cushion 53, and a charging socket 54.

Specifically, the socket support 49 is mounted on the steel structure of the parking space. The slide plate 50 is mounted on the socket support 49 by the pin 52. The socket mounting plate 51 is mounted on the slide plate 50 by the pin 52. The socket mounting plate 51 is slidable in a direction perpendicular to a sliding direction of the slide plate 50.

Specifically, the socket mounting plate 51 is provided with two guiding pointed conical rods.

Specifically, the charging socket 54 is mounted on the socket mounting plate 51.

Specifically, the socket support 49, the slide plate 50, and the socket mounting plate 51 are separated by the rubber cushion 53.

Figure 23:
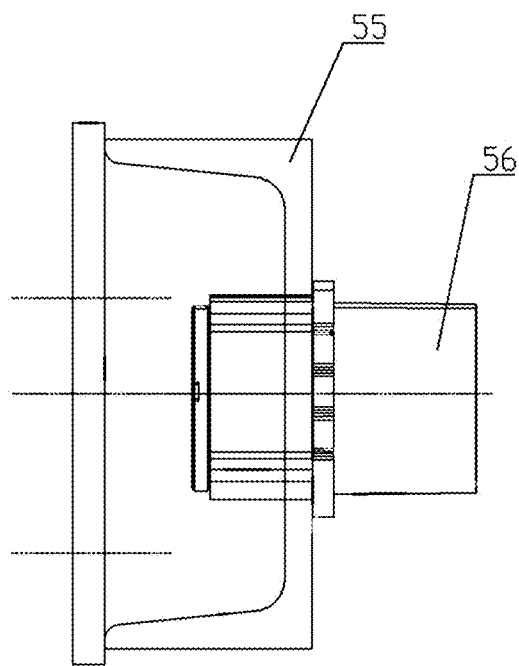
FIG. 23 is a side view of a plug assembly according to an embodiment of the present disclosure.
Figure 24:
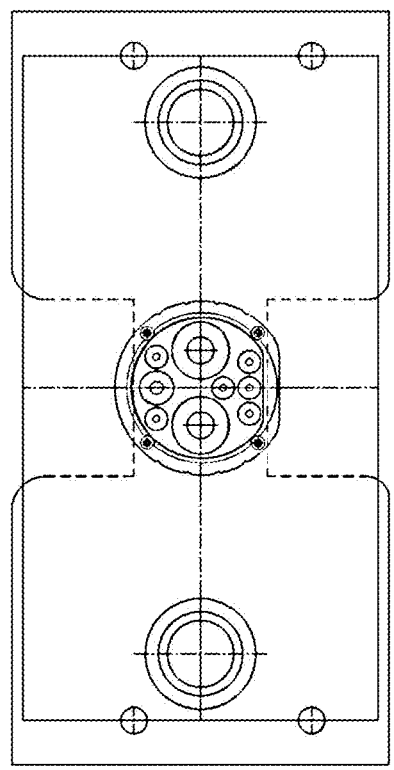
FIG. 24 is a top view of a plug assembly according to an embodiment of the present disclosure.
Figure 25:
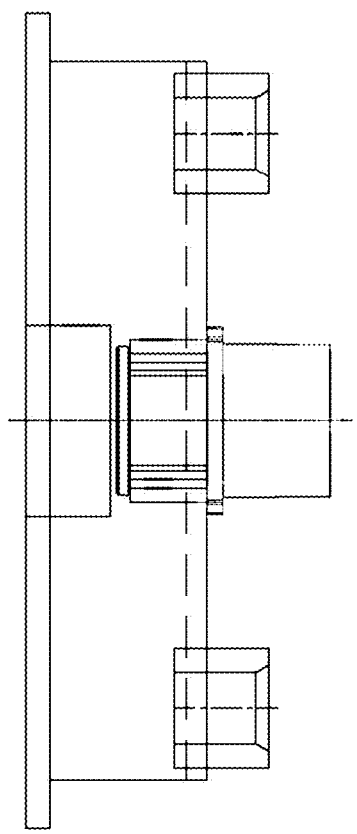
FIG. 25 is a front view of a plug assembly according to an embodiment of the present disclosure.

Further, reference is made to FIG. 23, FIG. 24, and FIG. 25. FIG. 23 is a side view of a plug assembly according to an embodiment of the present disclosure. FIG. 24 is a top view of a plug assembly according to an embodiment of the present disclosure. FIG. 25 is a front view of a plug assembly according to an embodiment of the present disclosure. The plug assembly 47 includes a plug seat 55 and a charging plug 56.

The plug seat 55 is mounted on a side surface of the side beam 39 of the vehicle supporting plate 3. The plug seat 55 is provided with two guiding holes. Each of the guiding hole matches a pointed conical end of the guiding pointed conical rod of the socket mounting plate 51, so that during bus storage, after a bus approaches a parking space along with the vehicle supporting plate, the guiding pointed conical rod on the socket mounting plate 51 is inserted into the guiding hole of the plug seat 55 to connect the plug assembly and the socket assembly.

The plug is aligned with the socket. After the vehicle supporting plate is stored in place, the plug is completely inserted into the socket. The power is turned on to perform charging.

Specifically, the charging plug 56 is mounted on the plug seat 55.

In an embodiment of the present disclosure:

After a bus is parked on the vehicle supporting plate through a left entrance/exit (right entrance/exit), a charging connector head at a tail portion of the vehicle supporting plate is inserted into an automobile charging socket to get ready for charging.

After a user confirms bus storage, the storage and retrieval device is started. The chain pin on the elevator platform is engaged with the long fork on the vehicle supporting plate.

The vehicle supporting plate is moved to the elevator platform. The elevator transmission system uses the power provided under the effect between the steel cable set and the pulley to take the elevator platform upward to an original placement floor for the vehicle supporting plate.

At the same time, the counterweight on the bottom floor of the garage enables the elevator platform to move upward more stably. The safety leveling device in the elevator platform is started. The pin in safety leveling is screwed into the pin base with the steel structure under a pushing force provided by the motor. A guide rail of the vehicle supporting plate is aligned with a guide rail of a parking space. The storage and retrieval device then pushes the vehicle supporting plate into the parking space. When the vehicle supporting plate is almost stored in place, the pointed conical rod on the socket mounting plate is inserted into the guiding hole of the plug seat to align the plug with the socket. After the vehicle supporting plate is stored in place, the plug is completely inserted into the socket. The power is turned on to perform charging. Eventually, the elevator platform places an extra vehicle supporting plate in the left entrance/exit (right entrance/exit).

By the parking process described above, in the multistorey garage, in one aspect, the elevator transmission system uses power to enable the elevator platform to make a vertical movement, so that the multistorey garage occupies a significantly reduced area, more buses can be parked in a same area, and the utilization of land is improved. In another aspect, in the multistorey garage, the charging device is mounted on the vehicle supporting plate, so that an automatic charging function is implemented.

The multistorey garage for buses provided according to the present disclosure is described above. Variations may be made to the specific implementations and application scope by persons skilled in the art according to the idea of the embodiments of the present disclosure. Therefore, the description shall not be construed as a limitation to the present disclosure. In addition, the present disclosure is applicable to a leveling system required for buses garage and is also applicable to household sedan garages or other elevation systems that require precise leveling.

INDUSTRIAL APPLICABILITY

In the multistorey garage for buses of the present disclosure, in one aspect, the elevator transmission system uses power to enable the elevator platform to make a vertical movement, so that the multistorey garage occupies a significantly reduced area, more buses can be parked in a same area, and the utilization of land is improved. In another aspect, in the multistorey garage, the charging device is mounted on the vehicle supporting plate, so that an automatic charging function is implemented.

The invention claimed is:

1. A multistorey garage for buses, comprising:
an elevator platform movable between a ground floor of the multistorey garage and an elevated level, comprising a storage and retrieval device and a safety leveling device,
an elevator transmission system positioned on a top floor of the multistorey garage, the elevator transmission system and the elevator platform being arranged symmetrically with respect to a horizontal central axis of the multistorey garage, the elevator transmission system comprising:
a main transmission frame,
a traction wheel mounted on the main transmission frame,
two motors, one of the two motors being mounted at one side of the traction wheel, and the other of the two motors being mounted at the other side of the traction wheel,
a transition wheel mounted on the main transmission frame and positioned between the traction wheel and the motor at the one side of the traction wheel, and
a steering wheel set comprising at least three steering wheels separately mounted on a middle beam, a front end beam, and the main transmission frame of the elevator transmission system,
a counterweight,
a steel cable set connected to the elevator transmission system, the counterweight, and the elevator platform,
a vehicle supporting plate in each parking space of the multistorey garage, and
a charging device mounted on each vehicle supporting plate;
wherein the storage and retrieval device comprises:
a framework,
two chain boxes respectively mounted at two ends of the framework,
a chain wheel,
two parallel chains respectively disposed in the two chain boxes, which are wound around and engaged with the chain wheel,
two chain pins respectively disposed in the two chain boxes, which are mounted on the parallel chains respectively at a preset distance from a central line of symmetry,
a motor, and
a transmission shaft.

2. The multistorey garage according to claim 1, wherein a body of the multistorey garage for buses is formed of a steel structure, and the steel structure is a framework structure in the garage that is made of a steel material and supports operation members of the garage.

3. The multistorey garage according to claim 2, wherein the steel structure comprises H steel.

4. The multistorey garage according to claim 1, wherein a bottom floor of the multistorey garage is provided with a bus washing shop, and the bus washing shop may be provided on the right side of the bottom floor of the multistorey garage or may be provided on the left side of the bottom floor of the multistorey garage.

5. The multistorey garage according to claim 4, wherein a ground transverse movement system is disposed in the bus washing shop for a bus to transversely move into the bus washing shop.

6. The multistorey garage according to claim 1, wherein the charging device is positioned near an outer end on the vehicle supporting plate, and the charging device is mounted on the vehicle supporting plate in each parking space.

7. The multistorey garage according to claim 1, wherein two safety leveling devices are provided and are symmetrically mounted at two ends of the elevator platform with respect to a central axis;
 each safety leveling device comprises a double output shaft motor, a coupling, a leadscrew, a leadscrew nut, a connecting block, a pin, and a pin base;
 the double output shaft motor is positioned on a longitudinal centerline of the elevator platform, and two output shafts of the double output shaft motor are respectively connected to a leadscrew by the coupling;
 the leadscrew nut is sleeved over the leadscrew, and the leadscrew nut is connected to the pin by the connecting block; and
 the pin base is fixedly disposed on a longitudinal beam of the elevator platform, and the pin is driven by the double output shaft motor to be screwed into or screwed out from the pin base.

8. The multistorey garage according to claim 1, wherein the steering wheel set comprises:
 a first steering wheel mounted in the middle of the middle beam of the elevator transmission system,
 a second steering wheel mounted in the middle of the front end beam of the elevator transmission system, and
 a third steering wheel mounted on the main transmission frame.

9. The multistorey garage according to claim 8, wherein the steel cable set comprises a plurality of steel cables, wherein one end of each of a preset number of steel cables is fixedly connected to a hanging beam of the elevator transmission system, the preset number of steel cables are sequentially wound around a movable pulley at a front end of the elevator platform, the second steering wheel, the transition wheel, the traction wheel, and a movable pulley disposed at the counterweight, and the other end of each of the preset number of steel cables is connected to the main transmission frame; and
 one end of each of the remaining steel cables is fixedly connected to the main transmission frame, the remaining steel cables are sequentially wound around a movable pulley at a rear end of the elevator platform, the third steering wheel, the second steering wheel, the transition wheel, the traction wheel, and the movable pulley at the counterweight of the bottom floor of the multistorey garage, and the other end of each of the remaining steel cables is connected to the main transmission frame.

10. The multistorey garage according to claim 1, wherein the vehicle supporting plate comprises a connector cable storage frame, a charging connector, a connector cable, a side beam, a long fork, a short fork, a cross beam, a panel, a longitudinal beam, a vehicle blocking rod, and a roller assembly;
 the connector cable storage frame is mounted at a tail end of the vehicle supporting plate, and the charging connector and the connector cable are placed on the connector cable storage frame;
 the side beam, the cross beam, the panel, and the longitudinal beam are integrated by a bolt;
 the long fork and the short fork are sequentially mounted on an outer side surface of the side beam from outside to inside;
 the vehicle blocking rod are mounted at an outermost side of the side beam; and
 a total of four roller assemblies are respectively mounted at four corners of the vehicle supporting plate by a bolt.

11. The multistorey garage according to claim 10, wherein the charging device comprises a plug assembly and a socket assembly, wherein the plug assembly is mounted on the side beam of the vehicle supporting plate, and the socket assembly is mounted on the steel structure of the parking space.

12. The multistorey garage according to claim 11, wherein the socket assembly comprises a socket support, a slide plate, a socket mounting plate, a pin, a rubber cushion, and a charging socket,
 the socket support is mounted on the steel structure of the parking space, the slide plate is mounted on the socket support by the pin, the socket mounting plate is mounted on the slide plate by the pin, and the socket mounting plate is slidable in a direction perpendicular to a sliding direction of the slide plate;
 the socket mounting plate is provided with two guiding pointed conical rods;
 the charging socket is mounted on the socket mounting plate; and
 the socket support, the slide plate, and the socket mounting plate are separated by the rubber cushion.

13. The multistorey garage according to claim 12, wherein the plug assembly comprises a plug seat and a charging plug, wherein the plug seat is mounted on a side surface of the side beam of the vehicle supporting plate, the plug seat is provided with two guiding holes, each of the guiding holes matches a pointed conical end of the guiding pointed conical rod, and the guiding pointed conical rod is inserted into the guiding hole to connect the plug assembly and the socket assembly; and the charging plug is mounted on the plug seat.

14. A method based on the multistorey garage according to claim 1, comprising:
 after a bus is parked on a vehicle supporting plate through an entrance/exit with a right/left direction, inserting a charging connector head at a tail portion of the vehicle supporting plate into an automobile charging socket to get ready for charging,
 after a user confirms bus storage, starting a storage and retrieval device, wherein a chain pin on a elevator platform is engaged with a long fork on the vehicle supporting plate,
 moving the vehicle supporting plate to the elevator platform, and taking, by a elevator transmission system, the elevator platform upward to an original placement floor for the vehicle supporting plate using power provided under the effect between a steel cable set and a pulley, wherein a counterweight movable between a bottom floor of the garage and an elevated level, enables the elevator platform to move upward more stably,
 starting a safety leveling device in the elevator platform, wherein a pin in the safety leveling device is screwed into a pin base with a steel structure under a pushing force provided by a motor, a guide rail of the vehicle supporting plate is aligned with a guide rail of a parking space, the storage and retrieval device then pushes the vehicle supporting plate into the parking space,
 when the vehicle supporting plate is almost stored in place, inserting a pointed conical rod on a socket mounting plate into a guiding hole of a plug seat to align the plug with the socket, and after the vehicle supporting plate is stored in place, the plug is completely inserted into the socket, the power is turned on to perform charging, and eventually the elevator platform places an extra vehicle supporting plate into the entrance/exit with a right/left direction.

* * * * *